(12) United States Patent
Ahnert et al.

(10) Patent No.: US 7,997,479 B2
(45) Date of Patent: Aug. 16, 2011

(54) READER WITH INTEGRATED ENCRYPTION UNIT

(75) Inventors: Axel Ahnert, Ismaning (DE); Elmar Grandy, Oberschleissheim (DE); Harald Muller, Langenbruck (DE); Jan Nebendahl, Ismaning (DE)

(73) Assignee: Axel Ahnert, Ismaning (DE)

( * ) Notice: Subject to any disclaimer, the term of this patent is extended or adjusted under 35 U.S.C. 154(b) by 684 days.

(21) Appl. No.: 11/909,832

(22) PCT Filed: Mar. 29, 2006

(86) PCT No.: PCT/EP2006/002862
§ 371 (c)(1),
(2), (4) Date: Mar. 17, 2008

(87) PCT Pub. No.: WO2006/103058
PCT Pub. Date: Oct. 5, 2006

(65) Prior Publication Data
US 2008/0203155 A1      Aug. 28, 2008

(30) Foreign Application Priority Data

Mar. 29, 2005   (DE) ......................... 10 2005 014 194

(51) Int. Cl.
*G06K 19/06* (2006.01)
(52) U.S. Cl. .................................. 235/380; 235/462.45
(58) Field of Classification Search .................. 235/380, 235/382, 492, 462.45, 472.02
See application file for complete search history.

(56) References Cited

U.S. PATENT DOCUMENTS

| 5,768,386 | A | 6/1998 | Yokomoto et al. | |
|---|---|---|---|---|
| 6,213,390 | B1 * | 4/2001 | Oneda | 235/379 |
| 6,270,011 | B1 | 8/2001 | Gottfried | |
| 6,560,709 | B1 | 5/2003 | Galovich | |
| 6,607,127 | B2 * | 8/2003 | Wong | 235/451 |
| 6,776,332 | B2 * | 8/2004 | Allen et al. | 235/380 |
| 2003/0191715 | A1 | 10/2003 | Pinizzotto | |
| 2004/0128519 | A1 | 7/2004 | Klinger et al. | |
| 2005/0066186 | A1 | 3/2005 | Gentle et al. | |

FOREIGN PATENT DOCUMENTS

| EP | 1 473 615 | 11/2004 |
|---|---|---|
| WO | WO 95/26085 A1 | 9/1995 |
| WO | WO 97/45979 A2 | 12/1997 |
| WO | 00/17758 | 3/2000 |
| WO | 2004/015516 | 2/2004 |
| WO | WO 2004/095355 A1 | 11/2004 |

\* cited by examiner

*Primary Examiner* — Daniel St. Cyr
(74) *Attorney, Agent, or Firm* — Sughrue Mion, PLLC

(57) ABSTRACT

The invention concerns a device for reading and encrypting sensitive data which are to be transmitted by way of a remote transmission network (7) to a central server (9). Particularly secure data transmission can be ensured if the system includes a reading unit (2) for reading the data, an encryption unit (3) connected thereto for encryption of the data, and a computer (4) which is connected to the encryption unit and which receives the data already encrypted from the encryption unit (3) and sends the encrypted data by way of a network interface (11) and the remote transmission network (7) to the central server (9).

5 Claims, 2 Drawing Sheets

READER WITH INTEGRATED ENCRYPTION UNIT

BACKGROUND OF THE INVENTION

The invention concerns a device for reading and encrypting sensitive data as set forth in the classifying portion of claim 1 and a corresponding method as set forth in the classifying portion of claim 7.

In many areas in daily life such as for example when withdrawing money from automatic teller machines, booking in at physicians practices or when communicating with authorities such as for example the tax office, the customer is required to prove his identity or authorisation. Correct identification of the user is generally a prerequisite for the enablement of further steps such as for example paying out money. A very wide range of different methods and systems are known from the state of the art for implementing identity or authorisation proof.

A system which is particularly frequently employed includes a card reader which reads out the data stored on a magnetic or chip card. Besides that, the user is generally additionally required to input a secret number (PIN) or a password. Other identification systems operate for example with scanners for detecting biometric data such as for example a fingerprint or the structure of the iris of the eye. The detected data are usually transmitted to a remote server where they are further processed and managed. For that purpose the data are firstly sent to a local computer, encrypted there and transmitted over the Internet to the central server. For reasons of data security it is a matter of the greatest importance that the data are transmitted securely and are not accessible at any time to unauthorised third parties.

Admittedly, by means of modern encryption methods such as for example PGP it is possible for the transmission of data over the Internet to be made sufficiently secure, but it is not possible thereby to prevent the data being accessed directly on the computer on which they are ascertained. Thus it is for example possible for the computer connected to the reader to be infected with a program (for example a trojan) and for the user data to be stored by means of that program and forwarded to unauthorised third parties. The consequence of that would be that extremely sensitive identification data would come into the possession of unauthorised parties and those parties could fraudulently use any services such as for example outgoing payments, remittances and so forth.

Therefore the object of the present invention is further to improve the security of identification systems and to prevent the penetration of unauthorised third parties.

SUMMARY OF THE INVENTION

That object is attained in accordance with the invention by the features recited in claim 1 and in claim 7. Further configurations of the invention are set forth in the appendant claims.

An essential concept of the invention provides for encrypting the data detected by means of a reader by means of an encryption unit connected to the reader and first passing the encrypted data to a local computer which transmits them (directly or indirectly) by way of a remote transmission network. That has the substantial advantage that the sensitive identification data are present only in encrypted form and thus are present on the local network computer in a form in which they cannot be used by unauthorised parties. Even if third parties should succeed in penetrating into the network computer they could not read the user data as they are already encrypted.

The encryption unit is preferably an apparatus which is structurally integrated together with the reading unit in one device.

The data which are read in can be compressed or reduced in order to reduce the amount of data for transmission. Data reduction is preferably effected by means of suitable software in the encryption unit.

The encryption unit is preferably connected to the local computer by way of a hardware interface. For that purpose it is possible to use any interface known from the state of the art such as for example a USB interface, a parallel interface or a serial interface. Optionally the encryption unit could also be connected to the local computer by way of a local network.

The encryption unit is preferably implemented in hardware form and includes for example a microcontroller with an encryption algorithm for encryption of the data which are read in.

The encryption unit preferably includes an encryption algorithm which preferably generates an alternate key. That is to say, each freshly generated key differs from a preceding one. The level of security in terms of data transmission can be further enhanced thereby.

The method according to the invention of securely transmitting data is described in greater detail hereinafter. Reading in and transmitting the personal data include substantially the following steps: firstly the data provided by the user (for example a fingerprint or an EC-card) are detected by a reading unit and transmitted to an encryption unit. There the data are encrypted by means of a predetermined algorithm. The encrypted data are then transmitted to a locally arranged computer, for example by way of a hardware interface, and from there by way of a remote transmission network to another computer connected to the network (for example a server). By virtue of the fact that there are only encrypted data at the network computer at the sending end, it is almost possible, with a sufficiently high security level in respect of encryption, for the original data to be reconstructed.

In accordance with a preferred embodiment of the invention an encryption method is carried out which uses at least two keys. In that case on request firstly a first key is generated—preferably by the subsequent recipient of the data—and that key is transmitted by way of the network and the local computer to the encryption unit. The first key is preferably automatically requested when a new data reading operation is started by the user.

The encryption unit thereupon generates a second key as well as a combined key formed from the first and second keys. The identification data of the user are then encrypted by means of the combined key. Furthermore the second key is preferably encrypted by means of the first key (or vice-versa). The encrypted identification data as well as the encrypted second key are then sent by way of the local computer and the network (for example the Internet) to the remotely arranged computer. There the personal data can finally be decrypted and subjected to further processing.

The encryption unit preferably produces an alternate second key. That means that the security in data transmission can be further improved in that way.

An even higher security level can be achieved if the key request command which is sent from the local computer to the external computer is continuously varied and for example includes at least a part of a previously received first key. An unauthorised key request can be easily recognised as a result thereof. In that case a warning message is preferably produced.

Another measure for improving the level of transmission security provides for transmitting a key or another item of information in packet-wise manner and optionally additionally acknowledging the receipt of the data.

Upon the receipt of a key a validity check is preferably implemented, in the course of which for example the key length, a checksum of the digits of the key or another key property is checked. Methods of that nature are sufficiently known from the state of the art.

Besides the actual code information the keys can also contain an additional item of information such as for example time information or a key number. In that way it is easily possible to check the validity of the key. A key can for example be recognised as being valid if the key was received within a predetermined time after the request for same. Otherwise the key loses its validity.

In accordance with a specific embodiment of the invention the encryption unit and the external computer preferably produce for each communication a plurality of keys A and B respectively which each have validity only for one communication. The central computer generates for example the keys $A_n$, $A_n'$, $A_n''$, and the encryption unit produces the keys $B_n$, $B_n'$, $B_n''$. In that case the index n stands for the n-th communication, wherein n is an integer. An overview of the various keys is found in following Table 1:

| Key | Producer | Location |
|---|---|---|
| $A_n$ | CS | CS |
| $A_n'$ | CS | E |
| $A_n''$ | CS | CS |
| $B_n$ | E | E |
| $B_n'$ | E | CS |
| $B_n''$ | E | E |

In the table the identification CS stands for the external computer (central system) and E stands for the encryption unit.

A respective one of the keys (for example $A_n'$, $B_n'$ is preferably transmitted to the other communication partner. (In regard to the key $A_n'$ see for example line 3 of the foregoing Table). By means of the other keys $A_n$, $A_n''$ and $B_n$, $B_n''$ respectively and the key $B_n'$ and $A_n'$ respectively obtained by the communication partner, each of the units then generates at least two combined keys $C_n$, $C_n''$ and $D_n$, $D_n''$ respectively. The combined keys C, D later serve for encryption of encryption data or other items of information which are to be sent over the network.

The generation and composition of the individual combined keys (metakeys) can be seen from following Table 2:

| Key | Producer | Comprising | Correspondence key | Location |
|---|---|---|---|---|
| $C_n$ | C | $A_n' \times B_n$ | $D_n''$ | C |
| $C_n''$ | C | $A_n' \times B_n''$ | $D_n$ | C |
| $D_n$ | CS | $A_n \times B_n'$ | $C_n''$ | CS |
| $D_n''$ | CS | $A_n'' \times B_n'$ | $C_n$ | CS |

Basically any item of information which was encrypted with a key $X_n'$ (in that case X stands as a place holder for keys A and B respectively) can be decrypted by a key $X_n$. Equally any item of information which was encrypted with a key $X_n''$ can be decrypted with a key $X_n''$. In contrast a key $X_n$ does not have any direct reference to another key $X_n''$.

The keys C and D respectively set out in the columns 'Key' and 'Correspondence key' in contrast are related to each other, in which case a respective key with the higher derivative (for example $C_n''$ or $D_n''$) can be decrypted by a corresponding key (for example $C_n$ or $D_n$) with the lower derivative.

Hereinafter consideration is to be given to a communication between the central system and the encryption unit by way of example for the communication n=1. Accordingly n=1 applies for the currently generated keys and n=0 applies for the keys A, B, C, D produced in a preceding communication.

The communication begins with the encryption unit requesting a first key $A_n'$ from the external computer. For that purpose it produces a request string $x_0$ and encrypts that with a key $C_0''$, and therefore forms $x_0 \times C_0''$. In that respect encryption of the request string x1 is optional.

The string is then transmitted by way of the network to the external computer which encrypts the information by means of the key $D_0$ (see Table 2, line 4). If the request $x_0$ was understood, the external computer generates the keys $A_1$, $A_1'$ and $A_1''$. The keys $A_1$ and $A_1''$ remain in the computer while $A_1'$ is transmitted by way of the network to the encryption unit. The first key $A_1'$ can also be encrypted, for example with a combined key $D_0''$. An item of information $A_1' \times D_0''$ is therefore formed. That information is decrypted by the encryption unit with the combined key $C_0$ (see also Table 2, line 2). If in that case a valid first key $A_1'$ can be extracted, the encryption unit subsequently produces the keys $B_1$, $B_1'$ and $B_1''$. The keys $B_1$ and $B_1''$ again remain in the encryption unit while the second key $B_1'$ is transmitted to the central computer. The second key $B_1'$ is in that case preferably encrypted with the first key $A_1'$, that is to say an item of information $B_1' \times A_1'$ is produced. That information is decrypted in the central computer by means of the key $A_1$ and checked for its validity.

The two communication partners (encryption unit and external computer) now contain a key $B_1'$ and $A_1'$ respectively generated by the other communication partner, as well as further, self-generated keys $A_1$, $A_1''$ and $B_1$, $B_1''$ respectively. The encryption unit generates therefrom two combined keys, namely $C_1$ and $C_1''$, as specified in Table 2. In the same manner the external computer generates two combined keys $D_1$ and $D_1''$, as also specified in Table 2.

The data $x_1$ recorded by the reading device can now be encrypted with the key $C_1''$, in which case an encrypted item of information $x_1 \times C_1''$ is formed, which is sent by the encryption unit to the central computer. The information $X_1 \times C_1''$ is then decrypted in the central computer by means of the combined key $D_1$.

After the decrypted biometric data have been extracted in the computer, an answer $x_2$ is preferably generated, which is preferably encrypted with the key $D_1''$ and sent back to the encryption unit. Encryption is again optional. The encryption unit then decrypts the information $x_2 \times D_1''$ with the key $C_1$ and thus extracts the answer $x_2$. The communication is thus concluded and is repeated in the next biometric data reading operation.

BRIEF DESCRIPTION OF THE DRAWINGS

The invention is described in greater detail by way of example hereinafter with reference to the accompanying drawings in which.

DETAILED DESCRIPTION OF THE INVENTION

Figure 1:
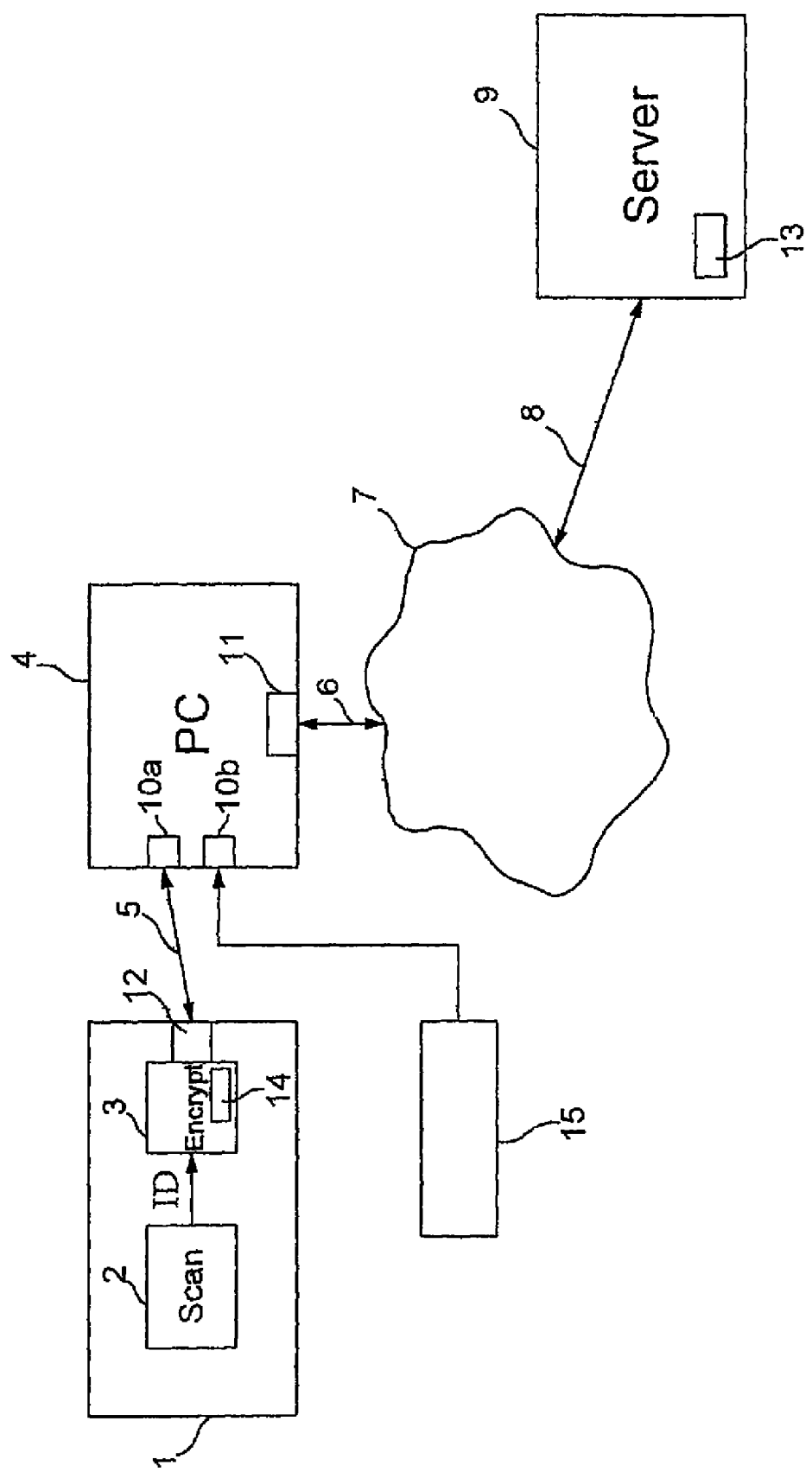
FIG. 1 shows a diagrammatic block view of a system for detecting and securely transmitting identification data by way of a remote transmission network.

FIG. 1 shows a system for detecting and transmitting identification data over a remote transmission network 7 such as for example the Internet. In the illustrated embodiment the system includes a fingerprint scanner 1 with a scanner unit 2 and an encryption unit 3 connected thereto. (Alternatively it would also be possible to provide a card reader or another reading device). The encryption unit 3 is here implemented in hardware form which is structurally integrated in the housing of the scanner unit 2. The encryption unit 3 includes software with which the read-in data are encrypted.

The scanner 1 is connected by way of a hardware interface 12 to a local computer 4 which is connected to the remote transmission network 7. The system further includes a second external computer 9 (for example a server) which is also connected to the remote transmission network 7.

The illustrated data connections 5, 6 and 8 between the individual devices 1, 4 and 9 can be wired or wireless.

In the context of an identification procedure firstly the fingerprint of the user is read and the corresponding data are transmitted to the encryption unit 3. There the data are encrypted by means of a predetermined algorithm. The encrypted data are then transmitted to the computer 4 and from there by way of the network 7 to the server 9. Therefore only encrypted data are present at the computer 4 so that even if it should be successfully possible to penetrate into the computer 4 from the outside, it is almost impossible to decrypt the original data.

Figure 2:
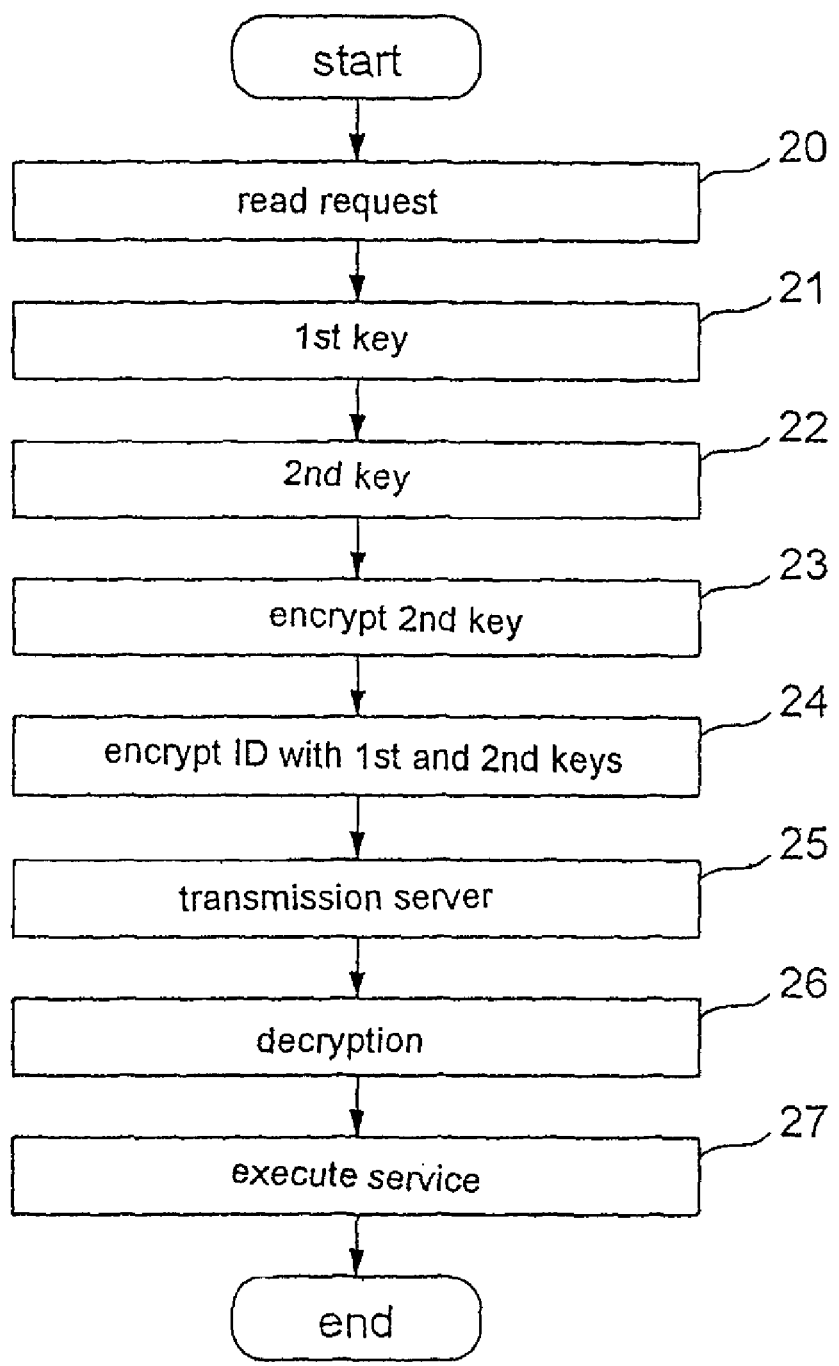
FIG. 2 shows the essential method steps in a method of securely transmitting identification data in accordance with an embodiment of the invention.

FIG. 2 shows the essential method steps in a preferred encryption method in the form of a flow chart. If a user wishes to identify himself at the scanner 1 and for that purpose places his finger on the reading window of the scanner unit 2, that is detected and signalled to the computer 4. In step 20 it then sends a key request command to the server 9. The command preferably includes an identification sign in respect of the scanner 1 and optionally further items of information such as for example an item of time information. The server thereupon generates a first key 13 in step 21 and sends it by way of the remote transmission network 7 back to the computer 4 and the scanner 1. When the first key 13 is properly received within a predetermined time that is confirmed by a corresponding return message to the central server 9. Otherwise the key loses its validity.

After the first key 13 is received the encryption unit 3 generates a second key 14 in step 22. Both the first and also the second key 13 and 14 respectively are preferably alternate keys. That excludes any regularity in the encryption method, which could afford a point of attack for possible manipulation operations.

In step 23 the encryption unit 3 then encrypts the second key 14 by means of the first key 13. In addition in step 24 the identification data (ID) are encrypted with a combined key formed from the first and the second keys 13 and 14 respectively. Prior to encryption if required the identification data can also be compressed or reduced in some other fashion. The encrypted data as well as the encrypted second key 14 are then sent to the server 9 by way of the computer 4 and the remote transmission network 7 (step 25). There the data are finally decrypted in step 26. The data can then be subjected to further processing and various services which are requested by the user can be implemented.

In order further to improve data security a key can be for example also divided into a plurality of packets which have to be respectively confirmed by the recipient (for example the scanner 1). That means that it is possible to establish with a high level of security that the first key 13 was also received by the scanner 1. Alternatively it would also be possible for each key 13 to be provided with an identification, for example a key number, which is confirmed by the reader 1. Possible manipulation can thus be detected at the server 9.

A further improvement in data security can be achieved if each scanner 1 or other readers 1 are registered with the central server 9 by an encrypted communication. That makes it possible to exclude foreign scanners 1 or readers 1 being installed and communicating with the server 9.

| List of references | |
|---|---|
| 1 | reader |
| 2 | reading unit |
| 3 | encryption unit |
| 4 | computer |
| 5 | data line |
| 6 | network connection |
| 7 | remote transmission network |
| 8 | network connection |
| 9 | central server |
| 10 | hardware interfaces |
| 11 | network interface |
| 12 | PC interface |
| 13 | first key |
| 14 | second key |
| 15 | input unit |
| 20-26 | method steps |

The invention claimed is:

1. A method of securely transmitting identification data which are read by a reading unit (2), encrypted and transmitted by way of a network (7) to a receiver (9), comprising the following steps:
   reading in data by means of the reading unit (2),
   encrypting the read-in data by means of the encryption unit (3),
   transmitting the encrypted data by way of an Interface (12) to a locally arranged computer (4), and
   thereafter by way of a network (7) to the receiver (9),
   wherein the encryption unit (3) performs the following steps:
   sending a key request command (20) to the receiver (9),
   receiving a first key (13) generated by the receiver (9),
   generating a second key (14),
   encrypting the second key (14) by means of the first key (13) or vice versa,
   encrypting the read identification data by means of a combined key formed from the first key (13) and the second key (14), and
   sending the encrypted second key (14) and the identification data encrypted with the combined key by way of the first computer (4) and the network (7) to the receiver (9).

2. A method as set forth in claim 1, wherein the data are transmitted between the encryption unit (3) and the first computer (4) by way of a hardware interface (12).

3. A method as set forth in claim 1, wherein the encryption unit (3) generates an alternate second key.

4. A method as set forth in claim 1, wherein the reading device (1) sends a key request command (20) to the second computer (9) when a reading operation is to be executed.

5. A method as set forth in claim 4, the key request command includes at least a part of a first key (13) already received by the encryption unit (3).

* * * * *